(12) United States Patent
Orth et al.

(10) Patent No.: US 8,021,600 B2
(45) Date of Patent: *Sep. 20, 2011

(54) METHOD AND PLANT FOR THE HEAT TREATMENT OF SOLIDS CONTAINING IRON OXIDE

(75) Inventors: Andreas Orth, Friedrichsdorf (DE); Martin Hirsch, Friedrichsdorf (DE); Peter Weber, Espoo (FI); Stuart Sneyd, South Perth (AU); Dirk Nuber, Frankfurt am Main (DE); Michael Stroeder, Neu-Anspach (DE)

(73) Assignee: Outotec Oyj, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,852

(22) Filed: Oct. 22, 2009

(65) Prior Publication Data

US 2010/0040512 A1    Feb. 18, 2010

Related U.S. Application Data

(62) Division of application No. 10/540,435, filed as application No. PCT/EP03/13500 on Dec. 1, 2003, now Pat. No. 7,625,422.

(30) Foreign Application Priority Data

Dec. 23, 2002  (DE) .................................. 102 60 733

(51) Int. Cl.
*F27B 15/02* (2006.01)
(52) U.S. Cl. ....................................... 266/172; 422/139
(58) Field of Classification Search ............... 75/366, 75/444, 450, 452, 453, 454, 455, 456, 459; 148/630; 266/172; 422/139, 143, 145, 147; 423/74, 148; 432/58, 197, 215
See application file for complete search history.

(56) References Cited

U.S. PATENT DOCUMENTS

| | | |
|---|---|---|
| 2,485,317 A | 10/1949 | Roetheli |
| 2,582,710 A | 1/1952 | Martin |
| 2,607,666 A | 8/1952 | Martin |
| 2,714,126 A | 7/1955 | Keith |
| 2,826,460 A | 3/1958 | Cameron et al. |

(Continued)

FOREIGN PATENT DOCUMENTS

AU          9894057          5/2000

(Continued)

OTHER PUBLICATIONS

Vijay: "Preoxidation and Hydrogen Reduction of Ilmenite in a Fluidized Bed Reactor" XP000632260, Metallurgical and Materials Transactions B, vol. 27B, Oct. 1996 pp. 731-738.

(Continued)

*Primary Examiner* — George Wyszomierski
*Assistant Examiner* — Mark L Shevin
(74) *Attorney, Agent, or Firm* — Leydig, Voit & Mayer, Ltd.

(57) ABSTRACT

A plant for the heat treatment of solids containing iron oxide. The plant includes a reactor including a fluidized bed reactor. The reactor includes a gas supply system disposed in the reactor, a stationary annular fluidized bed which at least partly surrounds the gas supply system, and a mixing chamber. The gas supply system is configured so that gas flowing through the gas supply system entrains solids from the stationary annular fluidized bed into the mixing chamber.

11 Claims, 3 Drawing Sheets

U.S. PATENT DOCUMENTS

| | | | |
|---|---|---|---|
| 2,864,674 A | 12/1958 | King | |
| 2,874,095 A | 2/1959 | Boisture et al. | |
| 2,901,421 A | 8/1959 | Bourguret at el. | |
| 3,528,179 A | 9/1970 | Smith | |
| 3,565,408 A | 2/1971 | Reh et al. | |
| 3,578,798 A * | 5/1971 | Lapple et al. | 432/58 |
| 3,671,424 A | 6/1972 | Saxton | |
| 3,876,392 A | 4/1975 | Kalina et al. | |
| 3,884,620 A | 5/1975 | Rammler | |
| 3,995,987 A | 12/1976 | MacAskill | |
| 4,044,094 A | 8/1977 | Barner et al. | |
| 4,073,642 A | 2/1978 | Collin et al. | |
| 4,080,437 A | 3/1978 | Reh et al. | |
| 4,091,085 A | 5/1978 | Reh et al. | |
| 4,191,544 A | 3/1980 | Boll et al. | |
| 4,338,283 A | 7/1982 | Sakamoto et al. | |
| 4,377,466 A | 3/1983 | Wallman | |
| 4,402,754 A | 9/1983 | Schmidt et al. | |
| 4,404,755 A | 9/1983 | Stewart et al. | |
| 4,490,287 A | 12/1984 | Hardwick et al. | |
| 4,545,132 A | 10/1985 | Li et al. | |
| 4,555,388 A | 11/1985 | Hundebol | |
| 4,676,824 A | 6/1987 | Daradimos et al. | |
| 4,716,856 A | 1/1988 | Beisswenger et al. | |
| 4,786,477 A | 11/1988 | Yoon et al. | |
| 4,789,580 A | 12/1988 | Hirsch et al. | |
| 4,795,547 A | 1/1989 | Barnes | |
| 4,806,158 A | 2/1989 | Hirsch et al. | |
| 4,817,563 A | 4/1989 | Beisswenger et al. | |
| 4,822,592 A | 4/1989 | Misra | |
| 4,919,715 A | 4/1990 | Smith et al. | |
| 4,992,245 A | 2/1991 | Van Slooten et al. | |
| 5,033,413 A | 7/1991 | Zenz et al. | |
| 5,205,350 A * | 4/1993 | Hirsch et al. | 165/104.18 |
| 5,269,236 A | 12/1993 | Okuno et al. | |
| 5,349,154 A | 9/1994 | Harker et al. | |
| 5,374,413 A | 12/1994 | Kim et al. | |
| 5,382,412 A | 1/1995 | Kim et al. | |
| 5,382,418 A | 1/1995 | Thone et al. | |
| 5,437,850 A | 8/1995 | Kroehl et al. | |
| 5,505,907 A * | 4/1996 | Hiltunen et al. | 422/146 |
| 5,527,379 A | 6/1996 | Hirsch et al. | |
| 5,560,762 A | 10/1996 | Bresser et al. | |
| 5,603,748 A | 2/1997 | Hirsch et al. | |
| 5,783,158 A | 7/1998 | Tacke et al. | |
| 5,942,110 A | 8/1999 | Norris | |
| 6,007,869 A | 12/1999 | Schreieder et al. | |
| 6,015,539 A | 1/2000 | Schmidt et al. | |
| 6,022,513 A | 2/2000 | Pecoraro et al. | |
| 6,074,533 A | 6/2000 | Tranquilla | |
| 6,110,413 A | 8/2000 | Jung et al. | |
| 6,197,234 B1 | 3/2001 | Goudmand et al. | |
| 6,368,389 B1 * | 4/2002 | Birke et al. | 95/275 |
| 6,395,248 B1 | 5/2002 | Kim et al. | |
| 6,413,477 B1 | 7/2002 | Govoni et al. | |
| 6,416,721 B1 | 7/2002 | Sanjurjo et al. | |
| 6,827,786 B2 | 12/2004 | Lord | |
| 6,830,597 B1 | 12/2004 | Green | |
| 2006/0162500 A1 | 7/2006 | Nuber et al. | |
| 2006/0230879 A1 | 10/2006 | Stroder et al. | |
| 2006/0230880 A1 | 10/2006 | Hirsch et al. | |
| 2006/0231433 A1 | 10/2006 | Rufo et al. | |
| 2006/0231466 A1 | 10/2006 | Nuber | |
| 2006/0249100 A1 | 11/2006 | Freytag et al. | |
| 2006/0263292 A1 | 11/2006 | Hirsch et al. | |
| 2007/0137435 A1 | 6/2007 | Orth et al. | |
| 2007/0278566 A1 | 12/2007 | Ogura et al. | |

FOREIGN PATENT DOCUMENTS

| | | |
|---|---|---|
| CN | 1732276 A | 2/2006 |
| CN | 1738918 A | 2/2006 |
| DE | 0575245 C | 4/1933 |
| DE | 1016938 B | 10/1957 |
| DE | 2524541 A1 | 12/1976 |
| DE | 2624302 A1 | 12/1977 |
| DE | 2805906 A1 | 8/1979 |
| DE | 3235559 A1 | 5/1984 |
| DE | 248109 | 7/1987 |
| DE | 3822999 C1 | 1/1990 |
| DE | 278348 A1 | 5/1990 |
| DE | 4015031 A1 | 11/1991 |
| DE | 4103965 C1 | 4/1992 |
| DE | 4206602 C1 | 6/1993 |
| DE | 4410093 C1 | 3/1995 |
| DE | 19609284 A1 | 9/1997 |
| DE | 19841513 A1 | 5/1999 |
| DE | 19813286 A1 | 9/1999 |
| DE | 69417103 | 9/1999 |
| DE | 10061386 A1 | 9/2002 |
| DE | 10164086 A1 | 8/2003 |
| EP | 0246191 A2 | 11/1987 |
| EP | 0534243 A1 | 3/1993 |
| EP | 0630683 A1 | 12/1994 |
| EP | 0630975 A1 | 12/1994 |
| EP | 0748397 A1 | 12/1996 |
| EP | 0995065 A1 | 4/2000 |
| GB | 915412 | 1/1963 |
| GB | 951245 A | 3/1964 |
| GB | 1502576 A | 3/1978 |
| WO | 89/09290 A1 | 10/1989 |
| WO | 90/11824 A1 | 10/1990 |
| WO | 98/08989 A1 | 3/1998 |
| WO | 01/44719 A1 | 6/2001 |
| WO | 02/055744 | 7/2002 |
| WO | 2004/056465 | 7/2004 |
| WO | 2004/056467 | 7/2004 |

OTHER PUBLICATIONS

Y.T. Kim et al. "Entrainment of solids in an internally circulating fluidized bed with draft tube" Chemical Engineering Journal, vol. 66, (1997), p. 105-110.

* cited by examiner

METHOD AND PLANT FOR THE HEAT TREATMENT OF SOLIDS CONTAINING IRON OXIDE

CROSS REFERENCE TO PRIOR APPLICATIONS

This application is a divisional of application Ser. No. 10/540,435, filed Mar. 27, 2006, now U.S. Pat. No. 7,625,422, which is a U.S. National Phase application under 35 U.S.C. §371 of International Application No. PCT/EP2003/013500, filed on Dec. 1, 2003 and which claims benefit to German Patent Application No. 102 60 733.8, filed on Dec. 23, 2002. The International Application was published in English on Jul. 8, 2004 as WO 2004/057039 under PCT Article 21(2).

FIELD

The present invention relates to a method for the heat treatment of solids containing iron oxide, in which fine-grained solids are heated to a temperature of 700 to 1150° C. in a fluidized bed reactor, and to a corresponding plant.

BACKGROUND

Such methods and plants are used for instance when smelting ores, for example in the production of iron from iron ores, ferronickel alloys from iron-nickel ores or the like. Before heat-treated in this way the ores are reduced in a succeeding process stage. While this preheating of iron oxide containing ores previously was chiefly carried out in rotary kilns, fluidized-bed reactors have also been used for this purpose for some years.

From EP 0 222 452 B1 there is known a method for reducing metal oxides to obtain lower metal oxides by means of carbonaceous reducing agents, in which initially solids containing higher metal oxides are calcined with hot gases at 800 to 1100° C. in a first reactor in which the solids are suspended by the hot gases. The solids calcined in this way are subsequently reduced to form lower metal oxides in a second reactor with a stationary fluidized bed by adding carbonaceous reducing agents and oxygen-containing gases at a temperature of 800 to 1100° C. Calcining can be carried out in a fluidized bed which is either formed stationary or preferably circulating. However, the energy utilization of the calcining step, which is achieved by using a stationary fluidized bed, needs improvement. This is due to the fact that the mass and heat transfer is rather moderate due to the comparatively low degree of fluidization, and therefore an internal combustion is difficult to control. In addition, a preheating of solids can hardly be integrated in a suspension heat exchanger, because dust-laden gases are rather not admitted to the fluidizing nozzles of the stationary fluidized bed. Due to the higher degree of fluidization, circulating fluidized beds on the other hand have better conditions for a mass and heat transfer and allow the integration of a suspension heat exchanger, but are restricted in terms of their solids retention time due to the higher degree of fluidization.

SUMMARY

Therefore, it is the object of the present invention to improve the conditions for a mass and heat transfer during the heat treatment of solids containing iron oxide.

In accordance with the invention, this object is solved by a method as mentioned above, in which a first gas or gas mixture is introduced from below through at least one preferably centrally arranged gas supply tube (central tube) into a mixing chamber region of the reactor, the central tube being at least partly surrounded by a stationary annular fluidized bed which is fluidized by supplying fluidizing gas, and the gas velocities of the first gas or gas mixture as well as of the fluidizing gas for the annular fluidized bed being adjusted such that the Particle-Froude-Number in the central tube lie between 1 and 100, in the annular fluidized bed between 0.02 and 2, and in the mixing chamber between 0.3 and 30.

DETAILED DESCRIPTION

Figure 1:
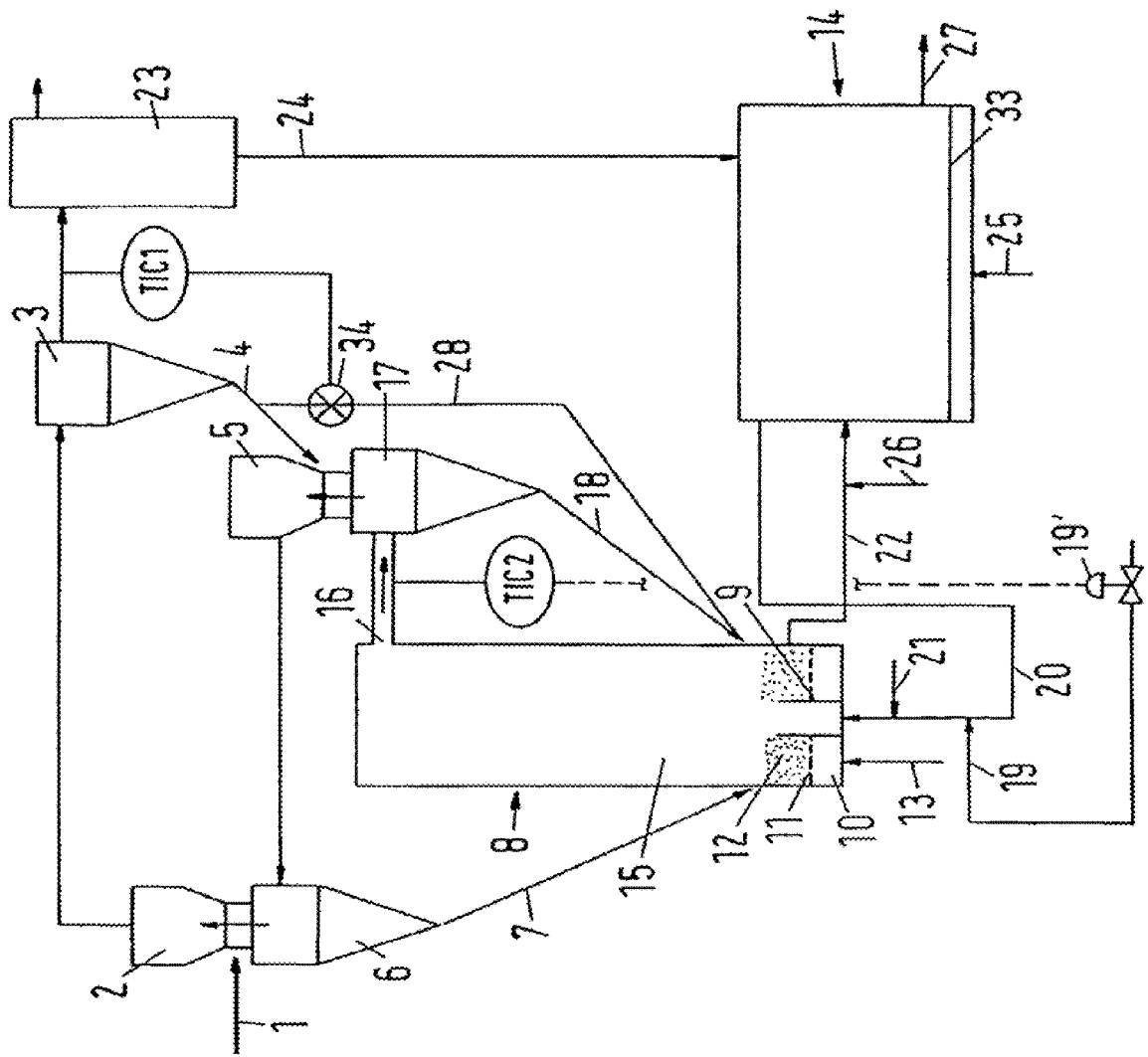
FIG. 1 shows a process diagram of a method and a plant in accordance with a first embodiment of the present invention.

In the method of the invention, the advantages of a stationary fluidized bed, such as a sufficiently long solids retention time, and the advantages of a circulating fluidized bed, such as a good mass and heat transfer, can surprisingly be combined with each other during the heat treatment, while the disadvantages of both systems are avoided. When passing through the upper region of the central tube, the first gas or gas mixture entrains solids from the annular stationary fluidized bed, which is referred to as annular fluidized bed, into the mixing chamber, so that due to the high slip velocities between the solids and the first gas an intensively mixed suspension is formed and an optimum mass and heat transfer between the two phases is achieved. By correspondingly adjusting the bed height in the annular fluidized bed as well as the gas velocities of the first gas or gas mixture and the fluidizing gas, the solids load of the suspension above the orifice region of the central tube can be varied within wide ranges, so that the pressure loss of the first gas between the orifice region of the central tube and the upper outlet of the mixing chamber can be between 1 mbar and 100 mbar. In the case of high solids loading of the suspension in the mixing chamber, a large part of the solids will separate out of the suspension and fall back into the annular fluidized bed. This recirculation is called internal solids recirculation, the stream of solids circulating in this internal circulation normally being significantly larger than the amount of solids supplied to the reactor from outside. The (smaller) amount of not precipitated solids is discharged from the mixing chamber together with the first gas or gas mixture. The retention time of the solids in the reactor can be varied within a wide range by the selection of height and cross-sectional area of the annular fluidized bed and be adapted to the desired heat treatment. Due to the high solids loading on the one hand and the good mass and heat transfer on the other hand, excellent conditions for a virtually complete combustion of the fuel introduced into the reactor are obtained above the orifice region of the central tube. There can, for instance, be performed a virtually complete combustion of natural gas close to the ignition temperature and/or with little excess of oxygen without local temperature peaks being obtained. The amount of solids entrained from the reactor with the gas stream is completely or at least partly recirculated to the reactor, with the recirculation expediently being fed into the stationary fluidized bed. The stream of solid matter thus recirculated to the annular fluidized bed normally lies in the same order of magnitude as the stream of solid matter supplied to the reactor from outside. Apart from the excellent utilization of energy, another advantage of the method in accordance with the invention consists in the possibility of quickly, easily and reliably adjusting the transfer of energy and the mass transfer to the requirements by changing the flow velocities of the first gas or gas mixture and of the fluidizing gas.

To ensure a particularly effective heat transfer in the mixing chamber and a sufficient retention time in the reactor, the gas velocities of the first gas mixture and of the fluidizing gas are preferably adjusted for the fluidized bed such that the dimensionless Particle-Froude-Numbers ($Fr_P$) are 1.15 to 20 in the central tube, 0.115 to 1.15 in the annular fluidized bed and/or 0.37 to 3.7 in the mixing chamber. The Particle-Froude-Numbers are each defined by the following equation:

$$Fr_p = \frac{u}{\sqrt{\frac{(\rho_s - \rho_f)}{\rho_f} * d_p * g}}$$

with
u=effective velocity of the gas flow in m/s
$\rho_s$=density of the solid particle in kg/m³
$\rho_f$=effective density of the fluidizing gas in kg/m³
$d_p$=mean diameter in m of the particles of the reactor inventory (or the particles formed) during operation of the reactor
g=gravitational constant in m/s².

When using this equation it should be considered that $d_p$ does not indicate the grain size ($d_{50}$) of the material supplied to the reactor, but the mean diameter of the reactor inventory formed during the operation of the reactor, which can differ significantly in both directions from the mean diameter of the material used (primary particles). From very fine-grained material with a mean diameter of 3 to 10 µm, particles (secondary particles) with a grain size of 20 to 30 µm are for instance formed during the heat treatment. On the other hand, some materials, e.g. certain ores, are decrepitated during the heat treatment.

In accordance with a development of the invention it is proposed to adjust the bed height of solids in the reactor such that the annular fluidized bed at least partly extends beyond the upper orifice end of the central tube by a few centimeters, and thus solids are constantly introduced into the first gas or gas mixture and entrained by the gas stream to the mixing chamber located above the orifice region of the central tube. In this way, there is achieved a particularly high solids loading of the suspension above the orifice region of the central tube, which allows e.g. a complete combustion under difficult conditions.

By means of the method in accordance with the invention, all kinds of ores containing iron oxide, in particular also those which contain in addition to iron other metal oxides, can effectively be heat-treated and possibly at the same time oxidized or reduced. In particular, the method can be used for the heat treatment of nickel ores containing iron oxide, manganese ores containing iron oxide and chromium ores containing iron oxide.

The generation of the amount of heat necessary for the operation of the reactor can be effected in any way known to the expert for this purpose.

In accordance with a particular embodiment of the present invention it is provided to supply fuel to the reactor, by whose combustion with an oxygen-containing gas the amount of heat required for preheating is completely or at least partly generated inside the reactor. In the last-mentioned alternative, the other part of the required amount of heat can then be covered by supplying hot gases or preheated solids. While solid fuel, such as coal, or liquid fuel, e.g. liquid hydrocarbons, is supplied to the reactor preferably via a corresponding feed conduit directly into the annular fluidized bed or the mixing chamber, gaseous fuels, e.g. natural gas, can either be introduced via a corresponding feed conduit into the annular fluidized bed, into a reactor region above the annular fluidized bed or through the central tube into the reactor.

To ensure a complete combustion of the fuel, oxygen-containing gas with an oxygen content of 15 to 30% is preferably supplied to the reactor, namely preferably either via a conduit above the annular fluidized bed or through the central tube.

In accordance with a development of the invention it is proposed to cover part of or the entire energy demand of the reactor by supplying exhaust gases from a downstream reactor, e.g. a reduction reactor, which possibly also contains fuel such as methane or carbon monoxide. Thus, the necessary demand of fresh fuel can be decreased distinctly or even be eliminated completely. This procedure is particularly recommendable in those methods in which after the heat treatment smelting of iron ores, for instance, is performed, as large amounts of exhaust gas with a temperature of up to 1500° C. are formed thereby. Preferably, the dust-laden exhaust gas is supplied to the reactor via the central tube, so that an expensive dedusting can be omitted. The combustion air is expediently introduced into the mixing chamber through a conduit above the annular fluidized bed. It is recommended to control the temperature inside the reactor by varying the amount of air supplied, the gas atmosphere at the outlet of the reactor still being slightly reducing.

When the calorific value of the exhaust gas of the reduction reactor is not sufficient for reaching the desired reactor temperature, it turned out to be advantageous to supply a mixture of an oxygen-containing gas, of gaseous fuel such as natural gas, and of exhaust gas from the downstream second reactor, which likewise contains fuel, to the reactor through the central tube. With this procedure, the mixing of the streams preferably takes place in the central tube, whereas ignition and combustion are effected in the mixing chamber, where a particularly effective heat transfer takes place between the hot particles of the stationary annular fluidized bed, which were entrained by the gas stream, and the process gases. In this case, the reactor temperature is controlled by varying the flow rate of the gaseous fuel, the amount of the oxygen-containing gas being adjusted such that a residual oxygen content of the exhaust gas is still present at the outlet of the reactor.

In accordance with another embodiment of the present invention, fresh fuel, preferably gaseous fuel, or fuel-containing exhaust gas from a downstream reactor or a mixture of fresh fuel and fuel-containing exhaust gases together with oxygen-containing gas is burnt in a combustion chamber upstream of the reactor, before the hot process gases thus generated are supplied to the reactor, preferably via the central tube. In this embodiment it is of course also possible to generate only part of the energy demand by the combustion of fresh fuel and cover the remaining part by supplying hot exhaust gases from a downstream reactor.

When the reactor is operated with high pressure, the reactor pressure can be utilized by using an expansion turbine. The preferred pressure values would be between 0.8 and 10 bar.

As gas for fluidizing the annular fluidized bed, dust-free hot or cold air is preferably supplied to the preheating reactor, and for this purpose, all other dust free gases or gas mixtures known to the expert for this purpose can of course also be used. It may also be advantageous to compress dedusted and cooled exhaust gas such that it can be utilized as fluidizing gas for the annular fluidized bed.

The amount of solids which is entrained by the gas stream flowing through the central tube and is discharged from the reactor, i.e. that amount which in the mixing chamber of the reactor does not fall back into the stationary annular fluidized bed, is separated in a cyclone downstream of the reactor and can completely or partly be recirculated via a solids return conduit. An essential advantage of this solids recirculation consists in that the solids loading of the suspension in the mixing chamber can specifically be adjusted to the requirements of the process, and even be changed during the operation as required.

In accordance with a development of this invention, the pressure loss between the central tube and the discharge conduit from the reactor is measured for this purpose and controlled by varying the amount of solids recirculated. It turned out to be particularly advantageous that a fluidized intermediate container with downstream dosing device, for instance a variable-speed rotary-vane (star) feeder or a roller-type rotary valve. The solids not needed for recirculation are discharged e.g. by means of an overflow.

When influencing the solids load of the suspension above the orifice region of the central tube is not required or a recirculation is not expedient for other reasons, the solids recirculation and the intermediate container can be omitted. The solids discharged with the gas stream are discharged completely in this case.

Upstream of the reactor, one or more preheating stages may be provided, in which the ore to be calcined and possibly to be reduced is preheated, and thus part of its moisture content is removed. Preferably, two preheating stages, each consisting of a suspension heat exchanger and a downstream cyclone, are provided upstream of the reactor, the material in the first suspension heat exchanger being heated by exhaust gas from the second suspension heat exchanger, and the material in the second suspension heat exchanger being heated by exhaust gas from the reactor. In this way, the total energy demand of the process is reduced.

In accordance with a development of the invention it is furthermore proposed to directly introduce into the reactor a part (0 to 100%) of the solids separated in the cyclone of the first preheating stage via a bypass conduit bypassing the second preheating stage, in dependence on the moisture content of the starting material, whereas the remaining amount is first introduced into the second preheating stage, before the same is also introduced into the reactor. The higher the moisture content of the starting material to be preheated and possibly to be reduced, the smaller will be chosen the amount of solids passed through the second preheating stage and the larger will be chosen the amount of solids passed through the bypass conduit. Thus, the procedure can flexibly be adjusted to the moisture content of the starting material with regard to an optimum utilization of energy.

A plant in accordance with the invention, which is in particular suited for performing the method described above, has a reactor constituting a fluidized-bed reactor for preheating and/or oxidizing or (pre.)reducing solids containing iron oxide, the reactor having a gas supply system which is formed such that gas flowing through the gas supply system entrains solids from a stationary annular fluidized bed, which at least partly surrounds the gas supply system, into the mixing chamber. Preferably, this gas supply system extends into the mixing chamber. It is, however, also possible to let the gas supply system end below the surface of the annular fluidized bed. The gas is then introduced into the annular fluidized bed e.g. via lateral apertures, entraining solids from the annular fluidized bed into the mixing chamber due to its flow velocity.

In accordance with a preferred aspect of the invention, the gas supply system has a gas supply tube (central tube) extending upwards substantially vertically from the lower region of the reactor preferably into the mixing chamber, which is at least partly surrounded by a chamber in which the stationary annular fluidized bed is formed. The central tube can constitute a nozzle at its outlet opening and have one or more apertures distributed around its shell surface, so that during the operation of the reactor solids constantly get into the central tube through the apertures and are entrained by the first gas or gas mixture through the central tube into the mixing chamber. Of course, two or more central tubes with different or identical dimensions or cross-sectional shapes may also be provided in the reactor. Preferably, however, at least one of the central tubes is arranged approximately centrally with reference to the cross-sectional area of the reactor.

In accordance with a preferred embodiment, a cyclone for separating solids is provided downstream of the reactor, where the cyclone can have a solids conduit leading to the annular fluidized bed of the first reactor.

To provide for a reliable fluidization of the solids and the formation of a stationary fluidized bed, a gas distributor is provided in the annular chamber of the reactor, which divides the chamber into an upper fluidized bed region and a lower gas distributor chamber. The gas distributor chamber is connected with a supply conduit for fluidizing gas. Instead of the gas distributor chamber, there can also be used a gas distributor composed of tubes.

For adjusting the temperatures necessary for preheating the solids, the reactor preferably has a fuel supply conduit leading to the central tube, the annular chamber and/or the mixing chamber. For the same purpose, a supply conduit for oxygen-containing gas is provided in the reactor, which either leads to the central tube or into a region above the fluidized bed region.

In addition or alternatively, a combustion chamber may be provided upstream of the reactor, in which fresh fuel and/or fuel-containing exhaust gases from a reactor downstream of the preheating reactor are burnt.

In accordance with a development of the invention, it is proposed to provide a gas conduit leading from a reduction reactor downstream of the preheating reactor to the central tube of the reactor, through which gas conduit at least part of the exhaust gases of the reduction reactor can be supplied to the preheating reactor.

Since extreme temperatures can be generated thereby for lack of solids, which extreme temperatures can for instance result in high $NO_x$ emissions or material problems, an internal combustion is preferred in general.

In the annular fluidized bed and/or the mixing chamber of the reactor, means for deflecting the solid and/or fluid flows may be provided in accordance with the invention. It is for instance possible to position an annular weir, whose diameter lies between that of the central tube and that of the reactor wall, in the annular fluidized bed such that the upper edge of the weir protrudes beyond the solids level obtained during operation, whereas the lower edge of the weir is arranged at a distance from the gas distributor or the like. Thus, solids raining out of the mixing chamber in the vicinity of the reactor wall must first pass by the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

The invention will subsequently be described in detail with reference to embodiments and the drawing. All features described and/or illustrated in the drawing form the subject-matter of the invention per se or in any combination, independent of their inclusion in the claims or their back-reference.

In the method shown in FIG. 1, which is in particular suited for preheating and prereducing iron-nickel ores and iron-manganese ores, fine-grained, possibly moist ore with a grain size of less than 10 mm is charged via a screw conveyor 1 into a suspension heat exchanger 2 of a first preheating stage, in which the material is preferably suspended and preheated by exhaust gas from a second preheating stage, until a large part of the surface moisture of the ore has been removed. Subsequently, the suspension is conveyed by the gas stream into a cyclone 3, in which the solids are separated from the gas. The separated solids then are conveyed through a conduit 4 into a second Venturi-type suspension heat exchanger 5, heated up further and again separated from the gas stream in a cyclone 6.

The ore thus preheated is conveyed through conduit 7 into the reactor 8, in which the material is heated to temperatures of 700 to 1150° C. for removing the residual crystal water. In its lower central region, the reactor has a vertical central tube 9 which is surrounded by a chamber of annular cross-section. Both the central tube 9 and the "annular chamber" can of course also have a cross-section different from the preferred round cross-section, as long as the annular chamber at least partly surrounds the central tube 9.

The annular chamber is divided into an upper and a lower part by a gas distributor 11. While the lower chamber serves as gas distributor chamber (wind box) 10 for fluidizing gas, the upper part of the chamber includes a stationary fluidized bed 12 (annular fluidized bed) of fluidized ore, e.g. iron ore, or a nickel, chromium or manganese ore containing iron oxide, the fluidized bed extending slightly beyond the upper orifice end of the central tube 9.

Through conduit 13, air is supplied to the reactor as fluidizing gas which flows through the gas distributor 11 into the upper part of the annular chamber, where it fluidizes the ore to be heated by forming a stationary fluidized bed. The velocity of the gases supplied to the reactor 8 preferably is chosen such that the Particle-Froude-Number in the annular fluidized bed 12 lies between 0.12 and 1.

Through the central tube 9, exhaust gas from a downstream reduction reactor 14 can constantly be supplied to the reactor 8, which after passing through the central tube 9 said exhaust gas flows through a mixing chamber 15 and an upper passage 16 into the cyclone 17. The velocity of the gas supplied to the reactor 8 preferably is adjusted such that the Particle-Froude-Number in the central tube 9 lies between 6 and 10. Due to these high gas velocities, the gas flowing through the central tube 9 entrains solids from the stationary annular fluidized bed 12 into the mixing chamber 15 when passing through the upper orifice region. Due to the banking of the fluidized bed in the annular fluidized bed as compared to the upper edge of the central tube 9, the fluidized bed flows over this edge towards the central tube 9, whereby an intensively mixed suspension is formed. The upper edge of the central tube 9 may be straight or indented or have lateral inlet openings. As a result of the reduction of the flow velocity by the expansion of the gas jet and/or by impingement on one of the reactor walls, the entrained solids quickly lose speed and fall back again into the annular fluidized bed 12. Only a small part of non-precipitated solids is entrained from the reactor together with the gas stream via the transition duct 16. Between the reactor regions of the stationary annular fluidized bed 12 and the mixing chamber 15 there is thus obtained a solids circulation which ensures a good heat transfer. Solids separated in the cyclone 17 are recirculated to the reactor 8 via the conduit 18, while the still hot exhaust gas is introduced into the suspension heat exchanger 5 of the second preheating stage.

The required process heat is covered by the combustion of fuel. For this purpose, e.g. natural gas is supplied to the reactor as fuel, which via conduit 19 is first introduced into conduit 20 and then via the central tube 9 into the reactor 8. Alternatively or in addition, solid fuel such as coal can also directly be introduced into the annular fluidized bed 12. Liquid fuels are expediently atomized with a gas in a two-fluid nozzle. The atomizing gas also cools the nozzle.

Another possibility is the fluidization of the annular fluidized bed 12 with gaseous fuel or a fuel-containing gas mixture. If no fuel is required, the gas distribution chamber must, however, be flushed with inert gas, e.g. nitrogen, to be able to switch over to air fluidization. This turned out to be expedient, in order to avoid an interruption of the fluidization of the annular fluidized bed 12.

In a non-illustrated further embodiment of a tubular gas distributor, a gas distribution chamber is omitted. The annular fluidized bed 12 is fluidized by air which is introduced through nozzles. The air is supplied to the nozzles by means of a manifold. Individual nozzles may be connected to a fuel supply conduit, so that fuel can be introduced. In this embodiment, the fluidization of the annular fluidized bed by air is maintained, even if no or little fuel is required.

In the preferred circuit as shown in FIG. 1, a fuel-containing exhaust gas of the downstream reduction reactor 14 is supplied through conduit 20. The energy content of this exhaust gas preferably is sufficient to achieve the desired reactor temperature. To ensure a complete combustion of the fuel, an oxygen-containing gas, preferably with an oxygen content of 15 to 30 vol-%, is supplied to the reactor, the gas first being introduced via the supply conduit 21 into the conduit 20 leading to the central tube 9, before flowing into the reactor 8 via the central tube 9. In the central tube 9, a mixture of fuel-containing exhaust gas and oxygen-containing exhaust gas should be obtained, whereas ignition and combustion should only take place in the reactor 8. Alternatively, the oxygen-containing gas can also be introduced into the reactor 8 via a supply conduit above the annular fluidized bed 12.

A particular advantage of the method of the invention consists in that the exhaust gas from the downstream reduction reactor 14, which has been introduced via the central tube 9 and contains gaseous fuel such as methane and carbon monoxide, can also be burnt in the reactor 8 and thus be utilized energetically without first having to be dedusted.

From the annular fluidized bed 12, part of the preheated material is continuously withdrawn from the reactor 8 via conduit 22 and introduced into the fluidized bed of the reduction reactor 14, in which the metal oxides contained in the solids are reduced to obtain lower metal oxides and/or metals. For the same purpose, preheated solids, which were separated in an electrostatic precipitator 23 from the exhaust gas of the cyclone 3 downstream of the first suspension heat exchanger 2, are supplied to the reduction reactor 14 via a conduit 24. As reducing agent, for instance reduction gas recovered from natural gas in an upstream cracking plant is used. This reduction gas is supplied to the reactor 14 via a conduit 25 through a tuyere bottom or gas distributor 33. In the case of a smelting reactor (cf. FIG. 3), coal dust can be injected into the smelting reactor as reducing agent.

Alternatively or in addition, liquid hydrocarbons or fine-grained coal can also be used as reducing agent, which can either be directly introduced into the stationary fluidized bed of the reactor 14 or be supplied to the reactor 14 together with the preheated or calcined solids via the conduits 26, 22. If liquid or solid reducing agents are used, an oxygen-containing fluidizing gas with an oxygen content of 10 to 25 vol-% must in addition be supplied to the reduction reactor via conduit 25 for forming the stationary fluidized bed. Reduced solids leave the reduction reactor 14 via conduit 27, while the dust-laden exhaust gas is supplied to the reactor 8 via conduit 20 and the central tube 9 without separating the dust content, in which reactor the fuel still contained in the exhaust gases is burnt. In this way, the exhaust gas from the reduction reactor 14 is utilized on the one hand as fuel for generating the temperature required in the reactor and on the other hand as carrier gas for suspending the solids entrained from the orifice region of the central tube 9 in the mixing chamber 15. Due to the energetic utilization of the exhaust gas from the reduction reactor 14 in the reactor 8 on the one hand and the optimum utilization of energy during preheating on the other hand, which is achieved as a result of the design of the reactor 8, a high efficiency is achieved by means of the method of the invention.

To obtain a greater flexibility as regards the choice of the starting materials, in particular with regard to the moisture of the ore used, with a chosen dimensioning of the reactor 8, there is provided a bypass conduit 28 leading from the cyclone 3 of the first preheating stage to the reactor 8, through which bypass conduit a predetermined amount of the solids separated in the cyclone 3 is directly introduced into the reactor 8. The remaining amount of solids is first passed through the second preheating stage, before the same is also introduced into the reactor 8 via conduit 7. In the case of particularly moist ores, the bypass conduit 28 allows to pass only a small partial stream through the second preheating stage or switch the same off completely, in order to avoid the condensation of steam in the electrostatic precipitator 23.

In accordance with the invention, the exhaust gas temperature is kept constant, in order to maximize the utilization of energy and avoid a condensation and thus corrosion damages in the exhaust gas path. The control of the exhaust gas temperature is effected in that in the case of high moisture and a decrease of the exhaust gas temperature in the cyclone 3 below the desired value, the feed rate of a metering device, for instance the rotational speed of a rotary vane feeder 34 or the like, is increased in the bypass conduit 28 (TIC1). As a result, more cold solids enter the reactor 8 and the temperature in the passage 16 falls below the desired value. By means of a further temperature control (TIC2) this leads to a greater opening of a fuel valve 19' in the fuel conduit 19. At the same time, less cold solids from the cyclone 3 get into the heat exchanger 5, so that the temperature in the heat exchanger 5 and the cyclone 6 rises in the direction of the desired value.

In contrast to the apparatus described above, the plant shown in FIG. 2 has a combustion chamber 29 upstream of the reactor 8, in which fuel or fuel-containing exhaust gas from a downstream melting reactor 30 is burnt before being introduced into the reactor 8.

To the combustion chamber 29, fuel-containing exhaust gas from the melting reactor 30 is supplied via conduit 19, air preheated in a heat exchanger 31 is supplied as combustion gas via conduit 21, and likewise preheated low-oxygen recycle gas is supplied via conduit 32. From the combustion chamber 29, the hot process gas generated by combustion, which has a temperature between 900 and 1700° C., is withdrawn via conduit 20 and introduced into the reactor 8 via the central tube 9, where the process gas fluidizes and preheats the solids introduced into the annular fluidized bed 12 via conduit 7. Furthermore, fluidizing gas for the annular fluidized bed 12 is supplied to the reactor 8 via conduit 13, and tertiary air for the temperature and oxygen control is supplied to the reactor 8 via conduit 35. Preferably, the velocities of the fluidizing gas and of the gas flowing through the central tube 9 are chosen such that the Particle-Froude-Numbers in the annular fluidized bed 12 lie between 0.12 and 1 and in the central tuyere 9 between 6 and 12.

Gas/solids mixture discharged from the reactor 8 is separated into the two phases in the cyclone 17. While the preheated solids are introduced into the smelting reactor 30 via conduit 22, the warm exhaust gas is first passed through the heat exchanger 31 and then cleaned by a non-illustrated gas cleaning device.

By means of this method it is ensured that the fuel is burnt completely before it is introduced into the reactor 8.

Figure 3:
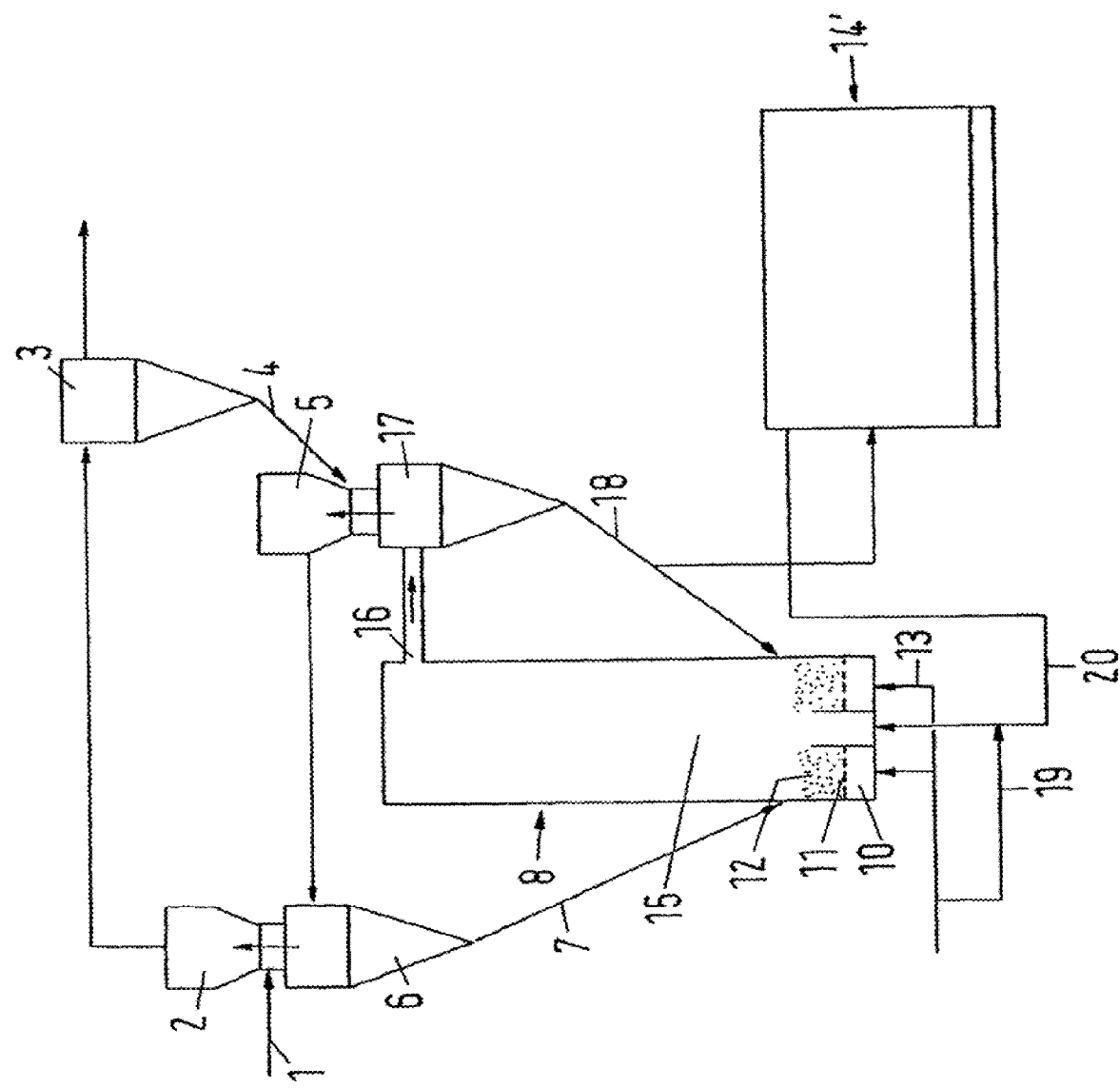
FIG. 3 shows a process diagram of a method and a plant in accordance with a third embodiment of the present invention.

The method illustrated in FIG. 3 differs from the one described in FIG. 1 in that the energy demand of the reactor 8 is exclusively covered by supplying hot exhaust gas from a downstream smelt reduction reactor 14'. Such reactors 14' are used for instance for the melt reduction of iron ore to obtain metallic iron, where considerable amounts of dust-laden exhaust gases having a temperature of about 1500° C. are produced.

Analogous to the method illustrated in FIG. 1, iron ore is first preheated in two preheating stages, each consisting of a suspension heat exchanger 2, 5 and a downstream cyclone 3, 6, before the solids are introduced into the annular fluidized bed 12 of the reactor 8 via conduit 7.

To the reactor 8, air is supplied as fluidizing gas via conduit 13 and exhaust gas of the downstream melt reduction reactor 14' is supplied via the central tube 9. Air is introduced via the gas stream conduit 19. Since the dust-laden exhaust gas is supplied to the reactor 8, an expensive dedusting can be omitted. Preferably, the velocities of the fluidizing gas and the gas flowing through the central tube 9 are chosen such that the Particle-Froude-Numbers in the annular fluidized bed 12 are between 0.1 and 1, in the central tuyere 9 between 5 and 10, and in the mixing chamber 15 between 1 and 5.

A partial stream of the heat-treated solids separated in the cyclone 17 is recirculated to the reactor 8 via conduit 18, whereas the other partial stream is supplied to the reactor 14' via conduit 22 for melt reduction.

A particular advantage of this method as compared to the methods known so far for this purpose consists in that there can be omitted an expensive dedusting of the exhaust gas from the melt reduction reactor 14', which is absolutely necessary before introducing the exhaust gas into a classical stationary fluidized bed. Since, moreover, in this method the supply of additional fuel can be omitted, an even better utilization of energy is obtained as compared to the method shown in FIG. 1.

The invention will be described below with reference to three examples demonstrating the inventive idea, but not restricting the same.

EXAMPLE 1

Heat Treatment of Lateritic Nickel Ore

In a plant corresponding to FIG. 1, 220 t/h lateritic nickel ore with a grain size of less than 10 mm, containing

| | |
|---|---|
| 1.75 wt-% | NiO, |
| 31.4 wt-% | $Fe_2O_3$, |
| 11 wt-% | moisture, | were supplied to the suspension heat exchanger 2 by means of the screw conveyor.

Upon passage through the first and second preheating stages, the predried nickel ore was introduced into a calcining reactor 8 via conduit 7. Furthermore, 6,200 Nm³/h natural gas as fuel (through conduit 19), 71,000 Nm³/h air as combustion gas (through conduit 21) as well as 32,600 Nm³/h exhaust gas from the reduction reactor (through conduit 20) were supplied to the calcining reactor 8 via the central tube 9, the gas having a temperature of about 800° C. and the following composition:

| | |
|---|---|
| 2 vol-% | $H_2$ |
| 18 vol-% | $H_2O$ |
| 10 vol-% | CO |
| 14 vol-% | $CO_2$ |
| 1 vol-% | $CH_4$ |
| 44 vol-% | $N_2$. |

In addition, 15,000 Nm³/h air were supplied to the reactor via conduit 13 as fluidizing gas for forming the annular fluidized bed 12. The temperature in the calcining reactor 8 was 900° C.

From the calcining reactor, 173 t/h calcined material were withdrawn, and the same amount was supplied to the reduction reactor 14 via conduit 22. Furthermore, 32,600 Nm³/h reduction gas, which also served as fluidizing gas, were supplied to the reduction reactor via conduit 25, the reduction gas having the following composition:

| | |
|---|---|
| 30 vol-% | $H_2$ |
| 25 vol-% | CO |
| 1 vol-% | $CH_4$ |
| 44 vol-% | $N_2$. |

Finally, 27,168 t/h calcined and prereduced solids (nickel ore) were withdrawn from the reduction reactor via conduit 27, which solids contained 1.6 wt-% metallic nickel and 35.5 wt-% FeO.

EXAMPLE 2

Heat Treatment of Chromium-Containing Iron Ore

Figure 2:
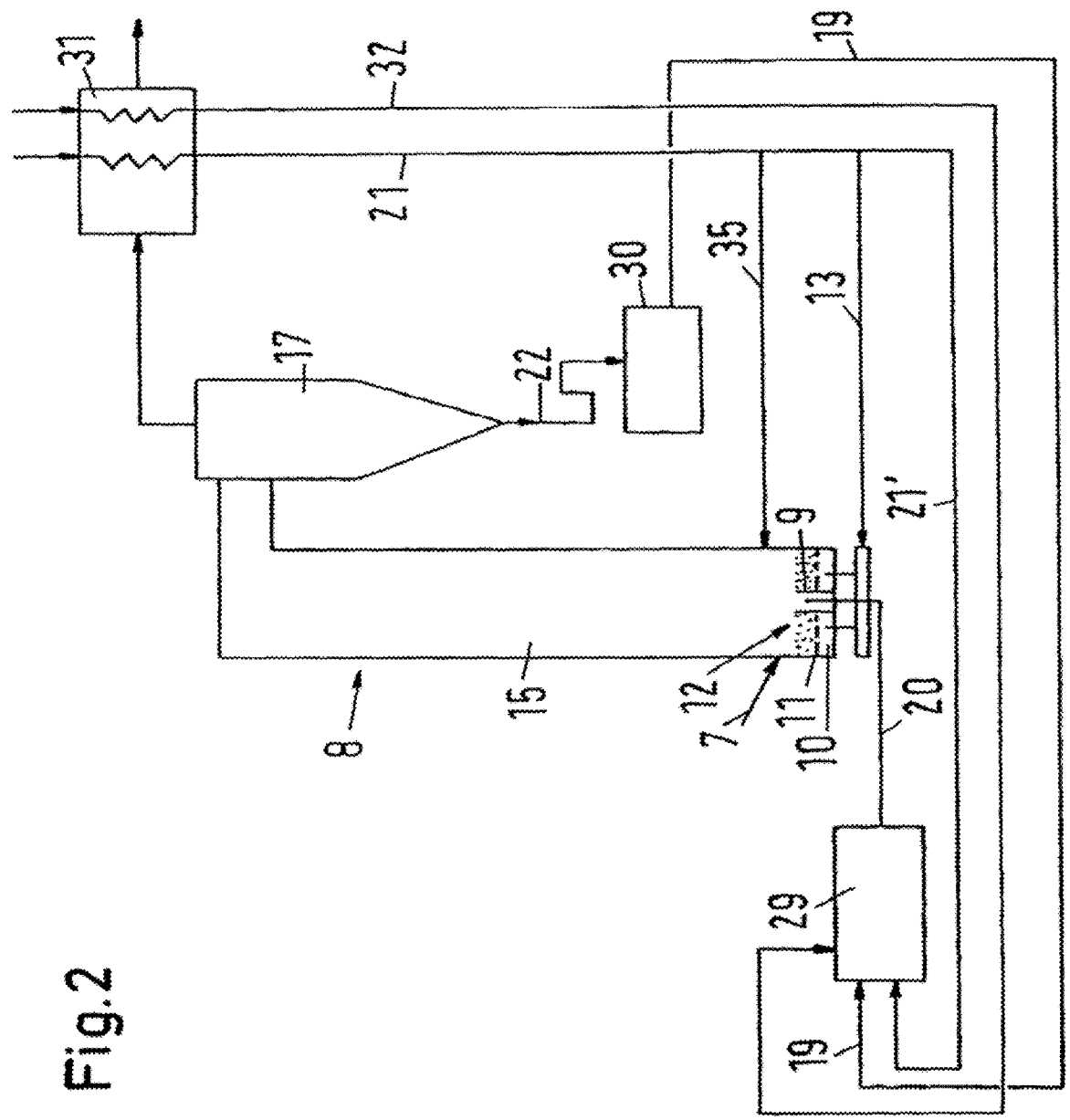
FIG. 2 shows a process diagram of a method and a plant in accordance with a second embodiment of the present invention.

In a plant corresponding to FIG. 2, 30 t/h chromium ore containing iron oxide with a moisture content of 5 wt-%, a $Cr_2O_3$ content of 53 wt-% and a grain size of not more than 6 mm were supplied to the reactor 8 through conduit 7.

To the combustion chamber 29, 4,500 Nm³/h fuel gas were supplied through conduit 19, 5,800 Nm³/h air preheated to 450° C. were supplied through conduit 21', and 4480 Nm³/h recycle gas likewise preheated to 450° C. were supplied through conduit 32. At the opposite side of the combustion chamber, 13,600 Nm³/h of hot process gas generated by combustion, which had a temperature of about 1600° C., were withdrawn through conduit 20 and supplied to the reactor via the central tube 9. Furthermore, 7,100 Nm³/h air were fed into the reactor as fluidizing gas via conduit 13.

21,300 Nm³/h exhaust gas with a temperature of 1100° C. were withdrawn from the cyclone 17, cooled to 870° C. in the succeeding heat exchanger 31, and ultimately cleaned in a gas cleaning device. Finally, 28.4 t/h chromium-containing ore with a temperature of 1100° C. were withdrawn from the calcining reactor via conduit 22 and supplied to the melting reactor 30.

EXAMPLE 3

Heat Treatment of Iron Ore

In a plant corresponding to FIG. 3, 178 t/h moist iron ore (hematite) with a moisture content of 5 wt-%, an $Fe_2O_3$ content of 80 wt-%, and a grain size of less than 10 mm were supplied to the suspension heat exchanger 2 via the screw conveyor 1 and dried with exhaust gas from the cyclone 6 and preheated to about 277° C. The exhaust gas from the cyclone 6 had the following composition:

| | |
|---|---|
| 46.9 vol-% | $N_2$ |
| 7.6 vol-% | $H_2$ |
| 11.4 vol-% | $H_2O$ |
| 5.7 vol-% | CO |
| 28.4 vol-% | $CO_2$. |

Subsequently, the solids were separated from the gas phase in the cyclone 3 and transferred to the suspension heat exchanger 5, in which they were further heated to a temperature of 561° C. by contact with hot exhaust gas of about 850° C. from the cyclone 17. Thereupon, the material was passed through the cyclone 6 and conduit 7 into the annular fluidized bed 12 of the reactor 8.

Via the central tube 9, a mixture of 13,000 Nm³/h air (conduit 19) and 103,000 Nm³/h hot exhaust gas of about 1000° C. (conduit 20) from the melt reduction reactor 14' was supplied to the reactor with a flow velocity of 65 m/s. The exhaust gas had the following composition:

| | |
|---|---|
| 45.1 vol-% | $N_2$ |
| 5.2 vol-% | $H_2$ |
| 8.7 vol-% | $H_2O$ |
| 18.5 vol-% | CO |
| 22.5 vol-% | $CO_2$ |
| 20-40 g/Nm³ | dust. |

In addition, about 20,000 Nm³/h air were supplied to the reactor via conduit 13 as fluidizing gas for forming the annular fluidized bed.

A partial combustion of the exhaust gas from the melt reduction reactor 14' with the air supplied at the same time took place in the lower region of the reactor. Due to the reducing gas atmosphere in the reactor 8, part of the hematite was prereduced to produce magnetite ($Fe_3O_4$).

LIST OF REFERENCE NUMERALS

1 screw conveyor
2 suspension heat exchanger of the first preheating stage
3 cyclone of the first preheating stage
4 solids conduit
5 suspension heat exchanger of the second preheating stage
6 cyclone of the second preheating stage
7 solids conduit
8 reactor
9 central tube
10 gas distributor chamber (wind box)
11 gas distributor
12 annular fluidized bed
13 supply conduit for fluidizing gas
14,14' reduction reactor
15 mixing chamber 16 transition duct
17 cyclone
18 solids return conduit
19,20,21 gas stream conduit
22. supply conduit for heat-treated solids
23 electrostatic precipitator
24 solids supply conduit
25 feed conduit for fluidizing gas/gaseous reducing agent
26 supply conduit for solid reducing agent
27 product discharge conduit
28 bypass conduit
29 combustion chamber
30 melting reactor
31 heat exchanger
32 recycle gas conduit
33 gas distributor
34 star feeder
35 tertiary air conduit

The invention claimed is:

1. A plant for the heat treatment of solids containing iron oxide, the plant comprising:
a reactor including a fluidized bed reactor comprising:
a gas supply system disposed in the reactor;
a stationary annular fluidized bed which at least partly surrounds the gas supply system; and
a mixing chamber,
wherein the gas supply system is configured so that gas flowing through the gas supply system entrains solids from the stationary annular fluidized bed into the mixing chamber, and
a combustion chamber disposed upstream of the reactor.

2. The plant recited in claim 1, wherein the gas supply system comprises at least one gas supply tube extending upwards substantially vertically from a lower region of the reactor into the mixing chamber of the reactor, the gas supply tube being at least partly surrounded by a chamber in which the stationary annular fluidized bed is formed.

3. The plant recited in claim 2, wherein the at least one gas supply tube is disposed approximately centrally with reference to a cross-sectional area of the reactor.

4. The plant recited in claim 2, wherein a shell surface of the at least one gas supply tube includes openings.

5. The plant recited in claim 4, wherein the openings of the at least one gas supply tube are slots.

6. The plant recited in claim 1, farther comprising a cyclone disposed downstream of the reactor, the cyclone being configured to separate solids and including a solids conduit leading to the annular fluidized bed of the reactor.

7. The plant recited in claim 2, wherein the reactor further includes an annular chamber with a gas distributor, the gas distributor dividing the chamber into an upper fluidized bed region and a lower gas distributor chamber, the lower gas distributor chamber being connected with a supply conduit configured to supply fluidizing as to the lower gas distributor chamber.

8. The plant recited in claim 7, wherein the reactor further comprises at least one of a fuel supply conduit leading to the at least one gas supply tube and a fuel supply conduit leading to the annular chamber.

9. The plant recited in claim 2, wherein the reactor further comprises an oxygen supply conduit for an oxygen-containing gas, the oxygen supply conduit leading to the at least one gas supply tube or into a region above the annular fluidized bed.

10. The plant recited in claim 2, wherein the at least one gas supply tube of the reactor is connected with a second reactor disposed downstream of the reactor via a supply conduit.

11. A plant for the heat treatment of solids containing iron oxide, the plant comprising:
a first reactor including a fluidized bed reactor comprising:
a gas supply system disposed in the first reactor;
a stationary annular fluidized bed which at least partly surrounds the gas supply system; and
a mixing chamber,
wherein the gas supply system is configured so that gas flowing through the gas supply system entrains solids from the stationary annular fluidized bed into the mixing chamber, and
a second reactor disposed downstream of the first reactor, the second reactor including a solids separator and a supply conduit configured to provide exhaust gas from the solids separator into the fluidized bed of the first reactor.

* * * * *